United States Patent
Lee, IV et al.

(10) Patent No.: US 8,342,134 B2
(45) Date of Patent: Jan. 1, 2013

(54) VIBRATION DAMPENING BARK CONTROL DEVICE

(75) Inventors: Albert Leon Lee, IV, Seymour, TN (US); William S. Groh, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 964 days.

(21) Appl. No.: 11/754,994

(22) Filed: May 29, 2007

(65) Prior Publication Data
US 2008/0134987 A1    Jun. 12, 2008

Related U.S. Application Data

(63) Continuation of application No. 10/831,519, filed on Apr. 23, 2004, now Pat. No. 7,222,589.

(51) Int. Cl.
*A01K 15/02* (2006.01)
*A01K 27/00* (2006.01)

(52) U.S. Cl. ........................................ 119/718

(58) Field of Classification Search .................. 119/718, 119/859, 908, 719, 721, 712, 856, 858, 905
See application file for complete search history.

(56) References Cited

U.S. PATENT DOCUMENTS

| | | | |
|---|---|---|---|
| 2,741,224 A * | 4/1956 | Putnam | 119/718 |
| 4,180,013 A | 12/1979 | Smith | |
| 4,762,088 A * | 8/1988 | Chapman et al. | 119/859 |
| 5,601,054 A * | 2/1997 | So | 119/718 |
| 5,799,618 A * | 9/1998 | Van Curen et al. | 119/721 |
| 5,858,521 A * | 1/1999 | Okuda et al. | 428/219 |
| 5,927,233 A * | 7/1999 | Mainini et al. | 119/718 |
| 6,588,376 B1 | 7/2003 | Groh | |
| 6,598,563 B2 * | 7/2003 | Kim et al. | 119/720 |
| 6,668,760 B2 | 12/2003 | Groh et al. | |
| 6,928,958 B2 * | 8/2005 | Crist et al. | 119/718 |
| 7,198,009 B2 | 4/2007 | Crist et al. | |
| 7,222,589 B2 * | 5/2007 | Lee et al. | 119/718 |
| 7,267,081 B2 * | 9/2007 | Steinbacher | 119/858 |
| 2005/0235924 A1 | 10/2005 | Lee et al. | |

FOREIGN PATENT DOCUMENTS

GB    2113346 A * 8/1991

\* cited by examiner

*Primary Examiner* — Son T Nguyen
(74) *Attorney, Agent, or Firm* — Pitts & Lake, PC

(57) ABSTRACT

A bark control device for deterring a dog from barking. The bark control device includes a vibration dampening material forming or covering at least a portion of the bark control device housing. The vibration dampening material reduces the transfer of vibrations through the bark control device housing by reducing the vibrations to levels undetectable by a bark sensor, by preventing the production of vibrations having characteristics sufficiently similar to a bark, and/or by inhibiting the propagation of such vibrations through the bark control device housing. The vibration dampening material of the housing reduces the occurrence of corrections to the dog due to vibrations emanating from a source other than a bark by the dog.

19 Claims, 5 Drawing Sheets

VIBRATION DAMPENING BARK CONTROL DEVICE

CROSS-REFERENCE TO RELATED APPLICATIONS

This application is a continuation of prior application Ser. No. 10/831,519, filed Apr. 23, 2004.

STATEMENT REGARDING FEDERALLY-SPONSORED RESEARCH OR DEVELOPMENT

Not Applicable

BACKGROUND OF THE INVENTION

1. Field of Invention

This invention relates to devices that control the barking of pet dogs. More specifically, the present invention relates to bark control devices having a vibration dampening feature that reduces the occurrence of false positives caused by ancillary physical contact with the bark control device.

2. Description of the Related Art

Electronic bark control devices and systems that control the barking of pet dogs by delivering a correction stimulus to the dog are known in the art. Such devices use various warning and correction stimuli such as, for example, an audible warning sound, and, more commonly, an electric shock. Further, such devices use various triggering mechanisms to determine when a bark has occurred and when a correction stimulus is to be delivered to a dog. Certain systems utilize a vibration sensor carried by the dog that detects vibrations generated by a bark and triggers the delivery of a correction stimulus. For example, the vibration sensor can be a piezoelectric device in contact with the throat of the dog as in the case of the system described in U.S. Pat. No. 5,601,054. However, bark control systems which utilize vibration sensors in contact with the throat of the dog to detect the barking of the dog can be prone to delivering false corrections to the dog. For example, the vibration sensor and associated electronic circuitry of the bark control device are typically disposed within a housing secured to the dog's neck with a collar. During the normal activities of the dog it is not uncommon for the housing to rub or scrape against objects such as furniture, bushes, food or water bowls, etc., causing vibrations. Such vibrations can be interpreted by the bark control device as a bark, resulting in a false correction being delivered to the dog. In this regard, false corrections can confuse the dog and undermine the training process. In order to limit the number of false corrections delivered to the dog, some bark control devices utilize a microphone which detects sound waves in addition to a vibration sensor which detects vibrations directly from the throat of the dog. Such devices can better discriminate between an actual bark by the dog wearing the device and other outside influences which could be mistakenly interpreted as a bark. However, devices utilizing microphones tend to be expensive, and tend to be less energy efficient such that the life of the batteries powering the devices can be significantly shortened. Therefore, bark control devices utilizing direct vibration monitors alone remain a popular alternative, notwithstanding the possibility of false corrections. Examples of various bark control devices are disclosed in U.S. Pat. Nos. 4,180,013; 5,927,233; 6,588,376; and 6,668,760.

BRIEF SUMMARY OF THE INVENTION

The present invention provides a bark control device to be carried by a dog for deterring the dog from barking and provides an associated vibration dampening housing, which reduces the possibility of false corrections being delivered to the dog. The bark control device includes a bark detection mechanism for detecting a bark emanating from the dog, this mechanism being a vibration sensor in one embodiment. The bark control device also includes a stimulus delivery circuit and circuitry for activating the stimulus delivery system in response to the detection by the bark detection mechanism of a bark by the dog. In one embodiment the circuitry for activating the stimulus delivery system includes a signal conditioning circuit disposed within the vibration dampening housing for conditioning the signal received from the bark detection mechanism. The circuitry also includes a processing device disposed within the housing for monitoring the conditioned signal from the signal conditioning circuit and activating the stimulus delivery system upon determination that the dog has barked.

The vibration dampening housing of the bark control device has a vibration dampening outer surface which makes the device less prone to misinterpreting vibrations from sources other than the vocal cords of the dog as a bark. Whereas the entire housing can be fabricated of an elastomer so as to provide the vibration dampening outer surface, in one embodiment an outer vibration dampening shell or coating of elastomer material is provided over an inner casing. The elastomer material can be a natural or synthetic rubber, a thermoplastic, or other resilient material. Accordingly, when the housing comes into contact with, or rubs against, another object, the resilient elastomer surface dampens any vibrations which may result from such contact. Further, the vibrations which are produced from such contact are characterized by an irregular stuttering pattern due to the friction between the vibration dampening surface and the contacting object. This stuttering pattern is dissimilar to the regular vibration pattern produced by a bark. Accordingly, the vibration dampening coating makes it less likely that vibrations will be misinterpreted by the device as a bark from the dog.

BRIEF DESCRIPTION OF THE SEVERAL VIEWS OF THE DRAWINGS

The above-mentioned features will become more clearly understood from the following description read together with the drawings in which.

DETAILED DESCRIPTION OF THE INVENTION

Figure 1:
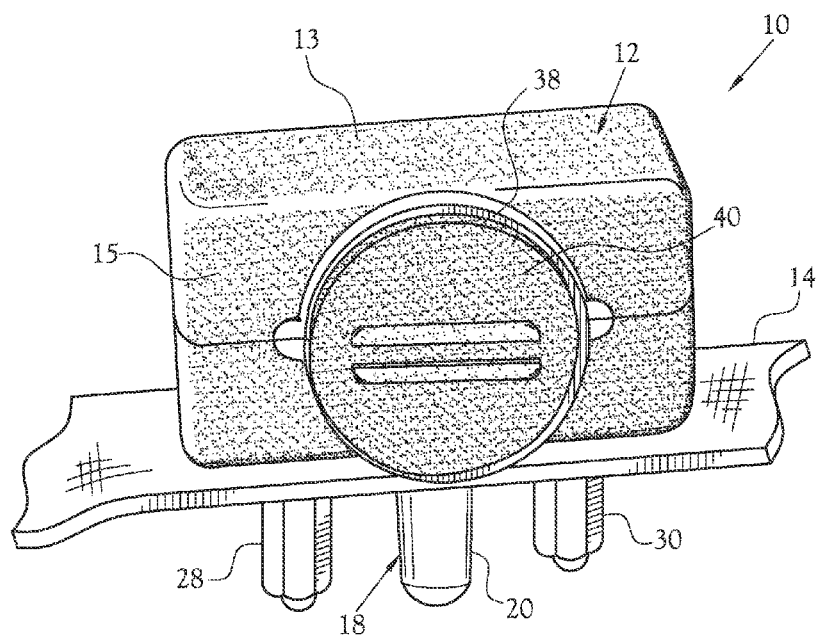
FIG. 1 is perspective view of a bark control device of the present invention mounted on a dog collar.

A bark control device for use with dogs is illustrated generally at 10 in the drawings. The bark control device 10 is designed to be worn by a target dog and deliver a correction stimulus to the target dog when the target dog barks in order to train the target dog not to bark. The bark control device 10 includes a bark sensor responsive to vibrations created when the dog barks. The bark control device further includes a vibration dampening material preventing vibrations generated by sources other than a bark by the target dog from being transferred to the bark sensor and/or altering the characteristics of vibrations generated by sources other than the target dog so that the vibrations are not interpreted as a bark. The result is a bark control device 10 that produces fewer erroneous correction stimuli because the bark control device 10 is less susceptible to false positives when performing bark detection.

As will be discussed in detail below, the housing 12 of the bark control device 10 has an outer vibration dampening material 13, which in one embodiment is defined by an elastomer shell or coating 15. The vibration dampening material 13 makes the bark control device 10 less prone to delivering false correction stimuli to the dog and, therefore, provides for more effective training of the dog. Further, it will be understood by those skilled in the art that the vibration dampening housing 12 can be used with various types of bark control systems. Thus, whereas the housing 12 is described below as being used in connection with a system employing a piezoelectric vibration sensor to detect barking and a stimulus delivery system which delivers a mild shock to a dog, it will be understood that there is no intent to limit the scope of the invention to devices employing this specifically described system.

Figure 2:
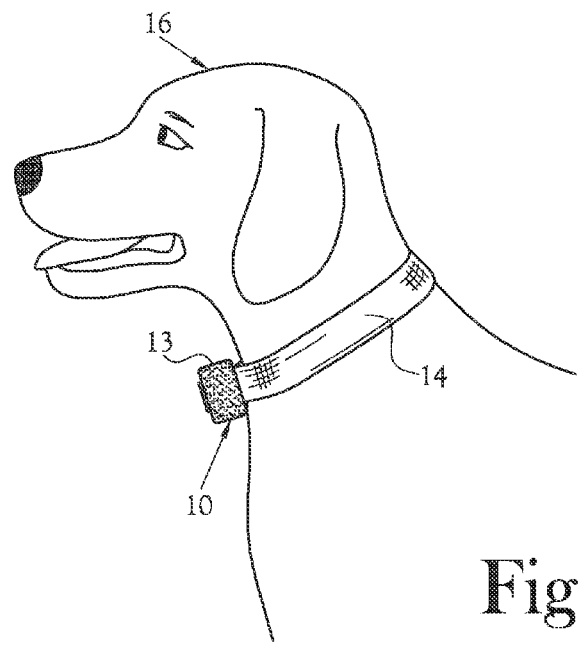
FIG. 2 is a side elevation view of a bark control device of the present invention as worn by a dog.
Figure 4:
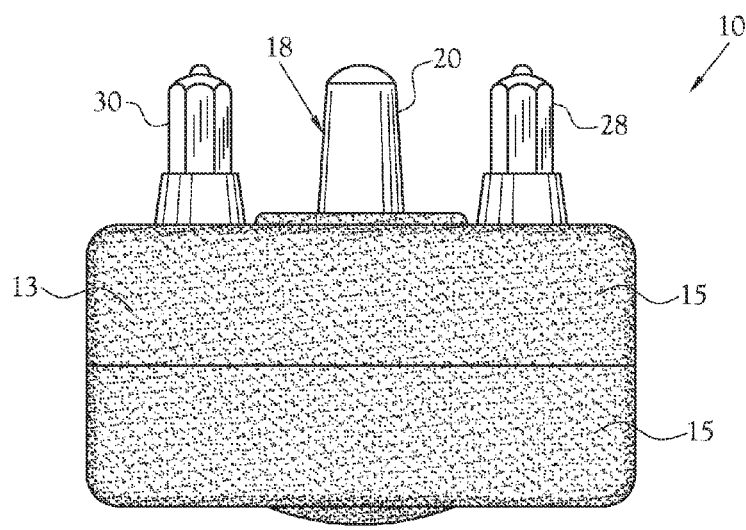
FIG. 4 is a top plan view of a bark control device of the present invention.

As illustrated in FIGS. 1 and 2, in one embodiment the bark control device 10 is designed to be mounted on a dog collar 14 which is received about the neck of a dog 16. The bark control device 10 includes a bark detection mechanism, or bark sensor 18, which in the illustrated embodiment includes an external probe 20 which is placed in contact with the throat of the dog 16 so as to directly detect vibrations generated by the vocal cords of the dog when the dog barks. The external probe 20 is in communication with a piezoelectric element that converts the vibrations transmitted by the external probe 20 into electrical signals usable the circuitry of the bark control device 10. The piezoelectric element is a low current device compared to other devices used for detecting the barking of a dog and, therefore, allows the bark control device 10 to have a longer battery life. It will, however, be recognized by those skilled in the art that the bark detection mechanism can be a microphone, or a combination of a microphone and other vibration sensing mechanisms, such as, for example, the bark detection mechanism disclosed in U.S. Pat. No. 5,927,233.

The bark control device generally has a portion of the housing 12 adapted to face the dog and be in physical contact and/or communication with the dog, either directly or indirectly. For convenience, such portion of the housing 12 shall be referred to as the facing portion. In the illustrated embodiment, the portion of the bark control device 10 from which the external probe 20 and the electrodes 28, 30, extend is facing portion and would be placed in indirect contact with the dog through the collar 14, the external probe 20, and the electrodes 28, 30.

In general, the bark control device 10 is responsive to vibrations transferred though an elastic medium. The bark control device 10 is designed to be responsive to such vibrations that are directly received by the bark sensor 18 (sound waves in the case of a microphone or mechanical vibrations in the case of a piezoelectric element). For reference, any vibrations not directly received by the bark sensor shall be referred to as "ancillary vibrations." Ancillary vibrations are introduced to a bark control device in various ways. One primary source for introducing ancillary vibrations is physical contact with the housing, which will produce sound and/or mechanical vibrations. To minimize the effect of ancillary vibrations, a typical bark control device attempts to isolate the bark sensor from the housing by bushings, o-rings, and other similar structures. Even with such isolation structures, a dog that is not barking occasionally receives a correction because the frequencies and patterns of the ancillary vibrations cannot be distinguished from an actual bark with the sensors and processing commonly used in bark control devices because of space constraints, costs, power consumption, and other related factors.

Figure 3:
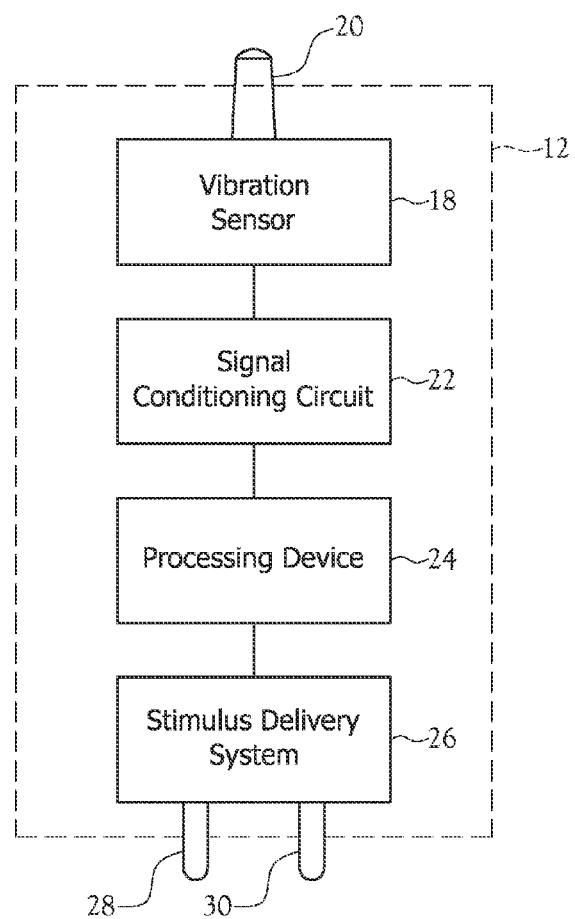
FIG. 3 is a block diagram of a bark control device of the present invention.

FIG. 3 is a block diagram of one embodiment of a bark control circuit used by the bark control device. In the illustrated embodiment, the bark control circuit includes a signal conditioning circuit 22 that conditions the vibration signal received from the bark sensor 18. The specific conditioning employed will depend upon the application and the desired level of sophistication of the bark detection circuit. However, typically, the signal conditioning circuit amplifies the output of the bark sensor 18 to increase the level of the sensor output for further processing and accurate sampling. The signal conditioning circuit 22 may also serve to discriminate among the vibrations measured by the bark sensor 18 so as to filter and/or pass the sensed vibrations meeting specified criteria. For example, the signal conditioning circuit 22 may be configured to pass only those vibrations occurring within a specified frequency range or those meeting certain durational limits or may be configured to remove unwanted components of the sensor output. Those skilled in the art will recognize the various filters, amplifiers, and other signal conditioning devices that can be used to prepare the measured vibrations for further processing. Those skilled in the art will also recognize that the type of signal conditioning depends upon the input signal, the corresponding sensor, and the desired characteristics of the input signal that are to be monitored. For example, the filter may be active or passive and may be set to pass a specific frequency range or remove high or low frequency noise. Further, depending upon the various components used, the output signal may not require additional amplification. Finally, other conditioning may be required to present a useable sensor output to the remainder of the circuit.

A controller or processing device 24 is also disposed within the housing 12 and monitors the amplified output of the signal conditioning circuit 22 and activates a stimulus delivery mechanism 26 as necessary, such as by the production of a stimulus request. Decision-making logic within the processor 24 determines whether a stimulus is needed. Typically, the input to the processor 24 is compared against a reference value to determine whether a stimulus is warranted. A conventional processing device includes an internal timer, memory registers, and math capabilities allowing sophisticated signal processing to occur; however, those skilled in the art will recognize that these capabilities can be achieved using other components without departing from the spirit and scope of the present invention. Further, those skilled in the art will recognize that the components used depend on various factors including the cost of manufacture, size and weight constraints, and the complexity of the decision process. For example, the size and weight of the training collar worn by the animal are reduced by implementing the controller in a single application specific integrated circuit (ASIC) or a microprocessor, both of which allow complex decision making capabilities. For lower cost, larger units implementing a simple decision tree, an array of discrete logic components can be used.

Various stimulus delivery mechanisms can be used to produce deterrent effects including electrical shock, audible alerts, and other deterrent types known to those skilled in the art. By way of example, the bark control device 10 illustrated in the Figures utilizes the stimulus delivery circuit 26 which delivers an electric shock as a correction stimulus. In this regard, the stimulus delivery circuit 26 incorporates a pair of electrodes 28 and 30 for transferring the electrostatic shock corrective stimulus to the dog when the delivery circuit 26 is activated by the processing device 24.

As set forth above, the housing 12 of the bark control device 10 has an outer vibration dampening material 13 which makes the bark control device 10 less prone to delivering false correction stimuli to the dog and, therefore, provides for more effective training of the dog. Whereas the entire housing 12 can be fabricated of an elastomer so as to provide the vibration dampening outer surface 13, in one embodiment the surface 13 is defined by a shell or coating 15 made from an elastomer. Examples of a suitable elastomer include a natural or synthetic rubber, a thermoplastic elastomer (TPE), or a thermoplastic vulcanizate (TPV), with one type of suitable TPV being members of the Santoprene® product families offered by Advanced Elastomer Systems, L.P., an affiliate of ExxonMobil Chemical. One skilled in the art will appreciate other various materials available for damping vibrations that may be used without departing from the scope and spirit of the present invention.

Impact of an object against a prior art housing or movement of an object across the surface of a prior art housing are known to produce vibrations that are not readily distinguishable from a bark using common bark sensor technologies. It will be understood that when the housing 12 comes into contact with or rubs against another object, the vibration dampening material 13 alters the characteristics of any vibrations which may result from such contact. The alterations produced by the vibration dampening material 13 include dampening (amplitude reduction) and continuity interruption (frequency alteration and/or pattern alteration). Dampening serves to prevent detection of the ancillary vibrations by making the energy of the vibration virtually undetectable to the bark sensor. With respect to vibrations resulting from the housing 12 contacting another object, the vibrations produced are characterized by an irregular, stuttering pattern due to the drag produced by the vibration dampening material 13 (defined by the coefficient of friction). This stuttering pattern is dissimilar to the regular vibration pattern produced by a bark. Accordingly, the vibration dampening material 13 makes it less likely that vibrations will be produced which will be misinterpreted by the bark control device 10 as a bark from the dog. Moreover, an object scraping against the vibration dampening material 13 produces vibrations which are at a lower frequency than vibrations produced by the barking of the dog or an object scraping against the conventional hard surface of a prior art housing. Accordingly, the processing device 24 can be configured to more easily discriminate between vibrations generated by the barking of the dog and vibrations directed to the housing but generated by objects scraping against the vibration dampening material 13. Therefore, it is less likely that false corrections will be delivered to the dog.

The vibration dampening material 13 covers at least a portion of the outer surface of the housing 12. In the illustrated embodiments, the vibration dampening material 13 covers a substantial portion of the housing 12 in a substantially continuous manner. However, the vibration dampening material need not form a continuous sheet or layer and, in some embodiments be provided with a plurality of through-openings. Alternatively, the vibration dampening material by be fabricated with recesses, which merely provide for varying thickness of the vibration dampening material. In other embodiments, the vibration dampening material is formed over the housing in a grid or as perforated sheet. The thickness and spacing of the grid are selected to prevent continuous and smooth movement over the surface of the housing and to prevent common objects from being able to make direct contact with the housing. The size, shape, and arrangement of openings or perforations are selected with the same considerations in mind. Providing a non-continuous or uneven layer of the vibration dampening material aids in the interruption of continuous motion across the surface of the bark control device.

Figure 5:
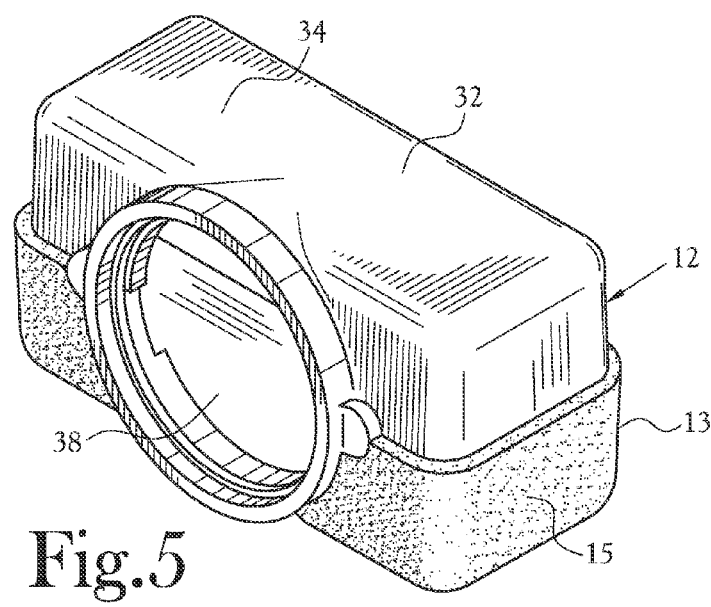
FIG. 5 is a partial perspective view of the vibration dampening housing of a bark control device of the present invention.
Figure 7:
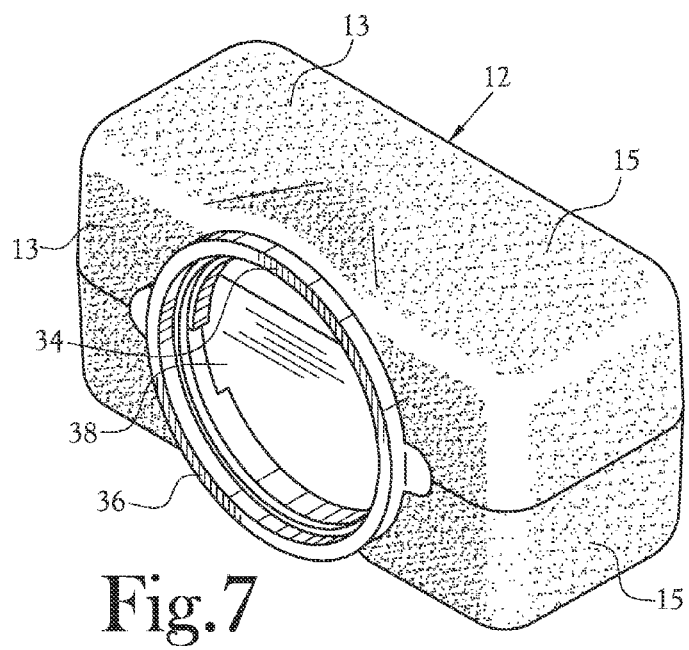
FIG. 7 is a perspective view of a vibration dampening housing of a bark control device of the present invention.
Figure 6:
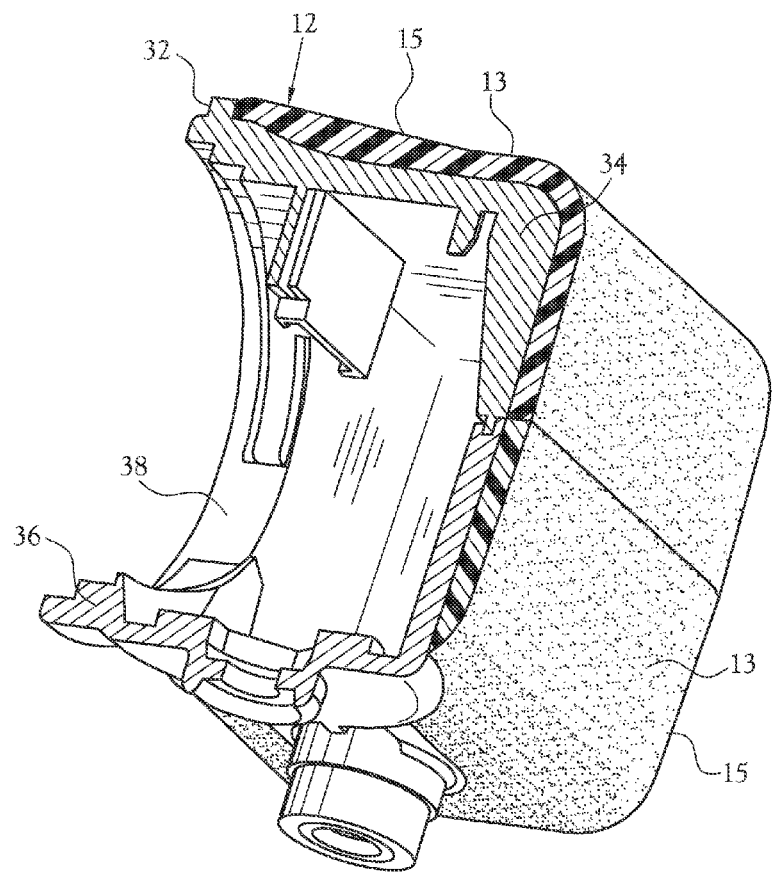
FIG. 6 is a perspective view, in section, of a vibration dampening housing of a bark control device of the present invention.

More specifically, and as best illustrated in FIGS. 5-7, in one embodiment the housing 12 includes an inner casing 32 having first and second casing components 34 and 36, respectively, which cooperatively serve to enclose various components of the bark control device 10. The coating 15 covers both of the casing components 34 and 36. It will also be noted that in this particular embodiment the casing components 34 and 36 cooperatively define an opening 38 for receiving and accessing a battery (not shown) which powers the bark control device 10. Further, the housing 12 is provided with a releasable closure 40 for selectively covering the opening 38, and the exterior surface of the closure 40 can also be provided with the vibration dampening coating 15.

With respect to the manufacture of the housing 12, in one embodiment the inner casing 32 is molded from a strong, rigid material such as, for example, a strong, durable plastic material. In this regard, where the casing 32 includes the separate casing components 34 and 36, the components 34 and 36 are separately molded. The coating 15 can be applied to the casing 32 using various methods, such as painting or spraying the coating 15 on the exterior of the casing, or dipping the casing 32 in the coating material. However, in one embodiment the coating 15 is over-molded onto the exterior surface of the casing components 34 and 36. Over-molding insures a more uniform coating thickness and results in better bonding of the coating 15 to the casing 32. After the coating 13 is applied to the casing components 34 and 36, the electronic components of the bark control device 10 can be positioned within casing components 34 and 36 and the casing components can be secured together with, for example, an adhesive or, alternatively, suitable mechanical fasteners.

Whereas the over-molding process described above insures a secure bonding of the coating 15 to the casing 32, it will be recognized that the coating 15 need not be directly bonded to, or adhere directly to, the casing 32. In this regard, it is contemplated that the coating 15 can be a sleeve or cover that is closely received about the casing 32 without being bonded thereto. It will also be noted that the desired thickness of the coating 15 will depend upon the particular material used to fabricate the coating, and other factors such as the cost the particular material used.

In light of the above, it will be recognized that the bark control device 10 described herein provides great advantages over the prior art. The vibration dampening material 13 greatly reduces the possibility of false corrections being delivered to the dog. Further, the vibration dampening material 13 reduces the need for complex and expensive circuitry for discriminating between vibration patterns produced by a bark and those produced by other sources, thereby reducing the overall cost of the bark control device.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicants general inventive concept.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicants general inventive concept.

Having thus described the aforementioned invention, what is claimed is:

1. A bark control device for use with a dog, said bark control device comprising:
   a housing adapted to be carried by a dog, said housing comprising a vibration dampening material forming an outer surface of at least a portion of said housing not facing the dog when said housing is carried by the dog, said vibration dampening material preventing vibrations communicated through said vibration dampening material from being detectable as barking;
   a stimulus delivery circuit carried by said housing, said stimulus delivery circuit adapted to apply a stimulus to the dog when said stimulus delivery circuit is activated; and
   a bark sensor carried by said housing, said bark sensor responsive to the vibrations received by said bark control device, said bark sensor being in communication with said stimulus delivery circuit, said bark sensor activating said stimulus delivery circuit when said vibrations are recognized as barking by said bark sensor.

2. The bark control device of claim 1 wherein said vibration dampening material prevents contact-induced vibrations from being transferred through said housing.

3. The bark control device of claim 1 wherein said vibration dampening material produces drag between said housing and an object moving across said housing.

4. The bark control device of claim 1 wherein said bark sensor comprises a vibration probe in communication with a piezoelectric element.

5. The bark control device of claim 1 wherein said bark sensor comprises a vibration probe in communication with a piezoelectric element, said vibration probe being external to said housing, said vibration probe being adapted to make physical contact with the dog.

6. The bark control device of claim 1 wherein said vibration is introduced to said bark control device through said vibration dampening material, said vibration dampening material reducing the amplitude of said vibration such that said vibration is not received by said bark sensor.

7. The bark control device of claim 1 wherein said vibration is introduced to said bark control device through said vibration dampening material, said vibration dampening material introducing irregularities into said vibration such that said vibration is not recognized as barking by said bark sensor.

8. The bark control device of claim 1 wherein said vibration is introduced to said bark control device through said vibration dampening material, said vibration dampening material altering the frequency of said vibration such that said vibration is not recognized as barking by said bark sensor.

9. The bark control device of claim 1 wherein said vibration dampening material has an outer surface with a sufficient coefficient of friction to substantially interrupt continuous motion across said outer surface.

10. The bark control device of claim 1 wherein said vibration dampening material is an elastomer.

11. The bark control device of claim 1 wherein said vibration dampening material is joined to said housing in a substantially permanent manner.

12. The bark control device of claim 1 wherein said vibration dampening material is integrally formed with said housing.

13. A bark control device for use with a dog, said bark control device comprising:
   a housing adapted to be carried by a dog, said housing defining a facing area, said facing area being a portion of said housing adapted to face the dog when said housing is carried by the dog;
   a bark sensor responsive to a vibration communicated to said bark control device, said bark sensor producing an stimulus request when said vibration is determined to be barking;
   a vibration dampening material covering a portion of an outer surface of said housing beyond said facing area, said vibration dampening material inhibiting said vibration when said vibration is communicated to said vibration dampening material, thereby causing said vibration not to be determined as barking by said bark sensor; and
   a stimulus delivery circuit in communication with said bark sensor, said stimulus delivery circuit adapted to apply a stimulus to the dog upon receipt of said stimulus request.

14. The bark control device of claim 13 wherein said vibration dampening material forming the outermost surface of said bark control device.

15. The bark control device of claim 13 wherein said vibration dampening material is joined to said housing outer surface.

16. The bark control device of claim 13 wherein said vibration dampening material forms a container receiving said housing outer surface.

17. The bark control device of claim 13 wherein said bark sensor comprises a vibration probe in communication with a piezoelectric element.

18. The bark control device of claim 13 wherein said bark sensor comprises a vibration probe in communication with a piezoelectric element, said vibration probe being external to said housing, said vibration probe being adapted to make physical contact with the dog.

19. A bark control device for use with a dog, said bark control device comprising:
   a housing adapted to be carried by a dog, said housing comprising a vibration dampening material on an exposed surface of at least a portion of said housing, said vibration dampening material preventing vibrations communicated through said vibration dampening material from being detectable as barking;
   a stimulus delivery circuit carried by said housing, said stimulus delivery circuit adapted to apply a stimulus to the dog when said stimulus delivery circuit is activated; and
   a bark sensor carried by said housing, said bark sensor responsive to the vibrations received by said bark control device, said bark sensor being in communication with said stimulus delivery circuit, said bark sensor activating said stimulus delivery circuit when said vibrations are recognized as barking by said bark sensor.

* * * * *